(12) United States Patent
Collins

(10) Patent No.: US 7,628,945 B1
(45) Date of Patent: Dec. 8, 2009

(54) EXTRUDED RADIUSED PLASTIC ARTICLES AND METHOD OF FORMING THE SAME

(76) Inventor: Larry P. Collins, 686 Richardson Rd., Owosso, MI (US) 48867

( * ) Notice: Subject to any disclaimer, the term of this patent is extended or adjusted under 35 U.S.C. 154(b) by 560 days.

(21) Appl. No.: 11/357,506

(22) Filed: Feb. 17, 2006

(51) Int. Cl.
*B29C 47/00* (2006.01)

(52) U.S. Cl. ............ 264/148; 264/177.16; 264/177.17; 264/167; 264/175; 264/210.2; 264/211.12; 264/293; 264/316; 264/294; 264/296; 425/375; 425/297; 425/394; 425/397; 425/403; 425/377; 425/380; 425/382.3

(58) Field of Classification Search ................. 425/375, 425/297, 377, 380, 382.3, 394, 397, 403, 425/403.1; 264/148, 177.16, 177.17, 167, 264/175, 210.2, 211.12, 293–296, 316
See application file for complete search history.

(56) References Cited

U.S. PATENT DOCUMENTS

| | | | |
|---|---|---|---|
| 897,760 A | 9/1908 | Martin | |
| 2,562,475 A * | 7/1951 | Emil | 83/320 |
| 2,654,124 A | 10/1953 | Layte | |
| 2,737,023 A | 3/1956 | Wolstenholme . | |
| 2,838,405 A | 6/1958 | Huckfeldt | |
| 3,060,845 A * | 10/1962 | Kent | 101/28 |
| 3,207,827 A | 9/1965 | Kuehnle | |
| 3,346,918 A | 10/1967 | Deleuze et al. | |
| 4,198,367 A | 4/1980 | Burrell | |
| 4,237,082 A | 12/1980 | LaSpisa et al. | |
| 4,265,607 A | 5/1981 | Klay | |
| 4,439,125 A | 3/1984 | Dieckmann et al. | |
| 4,661,184 A | 4/1987 | Klay | |
| 4,850,950 A * | 7/1989 | Holliday | 493/475 |
| 4,906,171 A | 3/1990 | Miller | |
| 5,095,830 A * | 3/1992 | Love | 101/28 |
| 5,137,673 A * | 8/1992 | Bourcier et al. | 264/151 |
| 5,297,949 A * | 3/1994 | Yokoi et al. | 425/297 |
| 5,770,129 A | 6/1998 | Monti | |
| 6,398,993 B1 | 6/2002 | Yushio et al. | |
| 6,454,555 B1 | 9/2002 | Kierbel et al. | |
| 6,645,406 B1 | 11/2003 | Slyne | |
| RE38,534 E | 6/2004 | Huang et al. | |
| 2005/0263253 A1* | 12/2005 | Steuer | 156/553 |
| 2007/0052129 A1* | 3/2007 | Meredith et al. | 264/210.1 |

OTHER PUBLICATIONS

Internet Page—Lowe's, Fabrics and Wraps, United Rubber Recycling 24" Mulch Mat Tree Ring, Item #80694, Model 24000.

* cited by examiner

*Primary Examiner*—Joseph S. Del Sole
*Assistant Examiner*—Nahida Sultana
(74) *Attorney, Agent, or Firm*—Young Basile

(57) ABSTRACT

Extruding radiused plastic articles with an extruding machine terminating in die defining a path of travel between upstream and downstream ends. The die has an outlet opening extending longitudinally in the direction of the path of travel, the opening oriented so a polymeric material is extruded therefrom in a direction approximately perpendicular to the path of travel through the die. Oppositely rotating rollers of tapered diameters are disposed side by side to receive the extrudate therebetween, the rollers arranged so their longitudinal axes intersect and their smaller diameters are oriented towards the downstream end of the die. Extrudate passing through the opening is characterized by a higher flow rate proximate the upstream end thereof to thereby form a radiused extrusion. The rollers draw the extrudate from the die outlet opening without significantly altering the radiused shape of the fluid plastic material.

3 Claims, 3 Drawing Sheets

EXTRUDED RADIUSED PLASTIC ARTICLES AND METHOD OF FORMING THE SAME

CROSS-REFERENCE TO RELATED APPLICATIONS

Not applicable.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

Not applicable.

FIELD OF THE INVENTION

The present invention pertains generally the field of plastic articles formed by the extrusion of a fluid polymer material, and more particularly to such plastic articles having a radiused shape effected by the unbalanced extrusion of the polymer material, thus dispensing with the necessity for performing extensive downstream operations to define such a radiused shape.

BACKGROUND OF THE INVENTION

Extrusion is an old and well known process for forming plastic articles. In general, extrusion conventionally involves plasticizing solid polymer, in the form of particles, powder, etc., by heating in an extrusion machine, and building pressure in the plasticized polymer material so as to be able to force the polymer material through a forming die at a downstream, discharge end of the extrusion machine.

Heretofore, it has conventionally been the practice in extruding through dies to maintain the dimensions of the die orifice constant, and further to orient the die outlet opening, so that the extrudate—that is, the polymer material extruded from the die—is balanced along the orifice and ejected along a path that is coaxial with the path of travel of the polymer material through the extruding machine to thus produce a linear extrusion. To the extent that further forming of this linear extrudate is required, including, for instance, cross-sectional shaping and bending, such operations have been performed by subsequent processing. In these regards, U.S. Pat. No. 6,454,555, the disclosure of which is incorporated by reference herein in its entirety, is exemplary.

Thus, it would be beneficial to have an alternate means of forming extruded plastic articles having a radiused shape and variable cross-section with a minimum of downstream shaping operations on the extrudate.

BRIEF SUMMARY

The specification addresses the foregoing needs, and presents other objects and advantages, through the provision of a method for forming radiused plastic articles from an extruded fluid polymeric material, the method comprising the steps of:

(a) Providing an extruding machine terminating in an extrusion die defining a path of travel for a fluid plastic material therethrough between an upstream end and a downstream end of the extrusion die, the extrusion die having an outlet opening extending longitudinally in the direction of the path of travel such that the extrusion die outlet opening is characterized by an upstream end and a downstream end, and the outlet opening further being oriented so that the fluid plastic material is extruded therefrom in a direction that is approximately perpendicular to the path of travel of the fluid plastic material through the extrusion die;

(b) Providing at least a first pair of oppositely rotating rollers of tapered diameters disposed side by side to receive therebetween the fluid plastic material extruded from the extrusion die, the rollers arranged so that their longitudinal axes intersect and their smaller diameters are oriented towards the downstream end of the extrusion die;

(c) Extruding a fluid plastic material through the extrusion die outlet opening, the extrudate being characterized by a higher flow rate proximate the upstream end of the extrusion die outlet opening and a lower flow rate proximate the downstream end of the extrusion die outlet opening to thus form a radiused extrusion;

(d) Drawing the extrudate from the extrusion die outlet opening with the tapered rollers without significantly altering the radiused shape of the fluid plastic material received therebetween;

(e) Cooling the extrudate; and (f) Sequentially cutting said cooled extrudate to form therefrom a plurality of radiused plastic articles.

According to one feature hereof, one or both of the tapered rollers may further comprise a die for embossing the extrudate.

Per another feature of the present invention, the method comprising the step of providing a cutting station comprising at least a first cutting blade operative to sequentially cut the cooled extrudate in response to a cutting signal, and wherein further said step of sequentially cutting the cooled extrudate is performed by said cutting station.

The specification further discloses an extruded plastic article which may be formed according to the inventive method, the article comprising a vegetation barrier including a monolithic plastic body radiused to define a discontinuous, generally circular shape having opposite upper and lower surfaces, opposite first and second terminal ends defining therebetween the complete arc length of the generally circular shape, an outside circumferential edge, and a centrally disposed opening defining an inside circumferential edge. The plastic body is characterized by a cross-sectional thickness which decreases from a maximum proximate the outside circumferential edge thereof to a minimum proximate the inside circumferential edge thereof, and the vegetation barrier is characterized by a default condition characterized in that the first terminal end overlaps the second terminal end to a degree sufficient to prevent significant ambient light from penetrating completely between the overlapped terminal ends.

According to one aspect of this invention, the vegetation barrier is characterized by an arc length of approximately 450° between the first and second terminal ends such that, in the default condition of the vegetation barrier, the first terminal end overlaps the second terminal end by an arc length of approximately 90°.

Per yet another feature hereof, one or both of the opposite upper and lower surfaces of the vegetation barrier may be embossed, such as with, by way of non-limiting example, an aesthetically pleasing design.

BRIEF DESCRIPTION OF THE DRAWINGS

These and other features of the instant invention will be better understood with reference to the following description and accompanying drawings, of which.

WRITTEN DESCRIPTION

Figure 1:
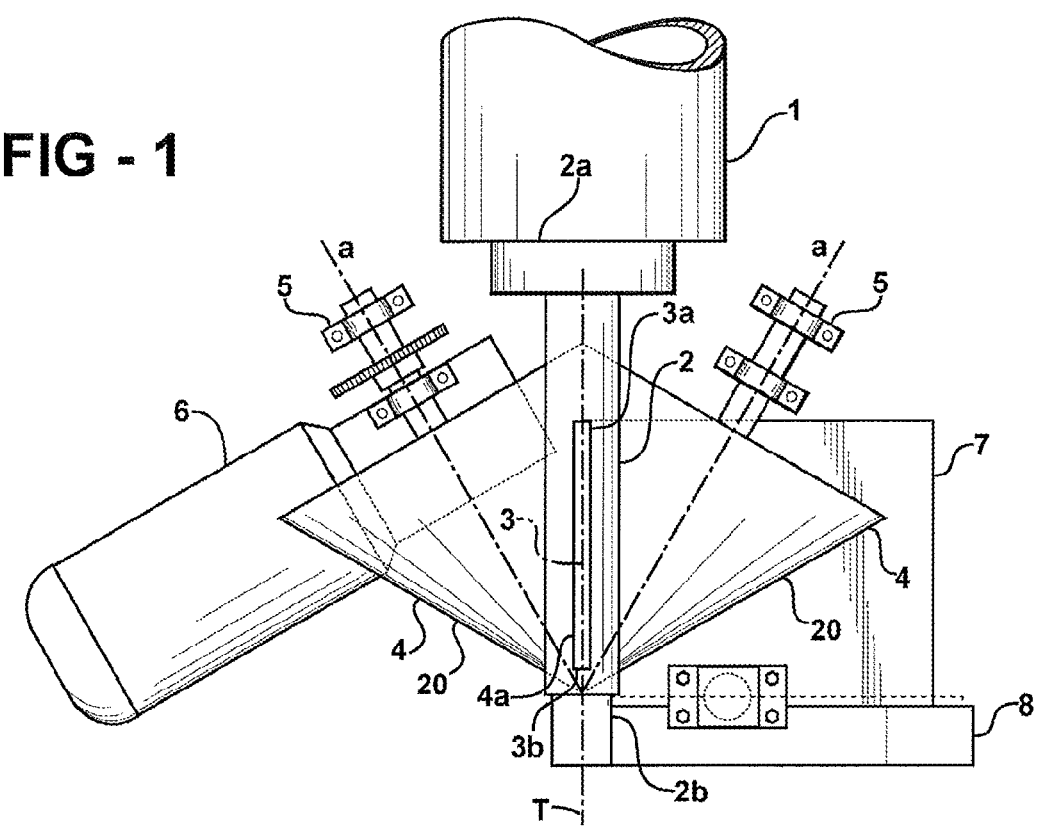
FIG. 1 is a simplified partial plan view depicting the apparatus employed in the extrusion methodology of the present invention.
Figure 2:
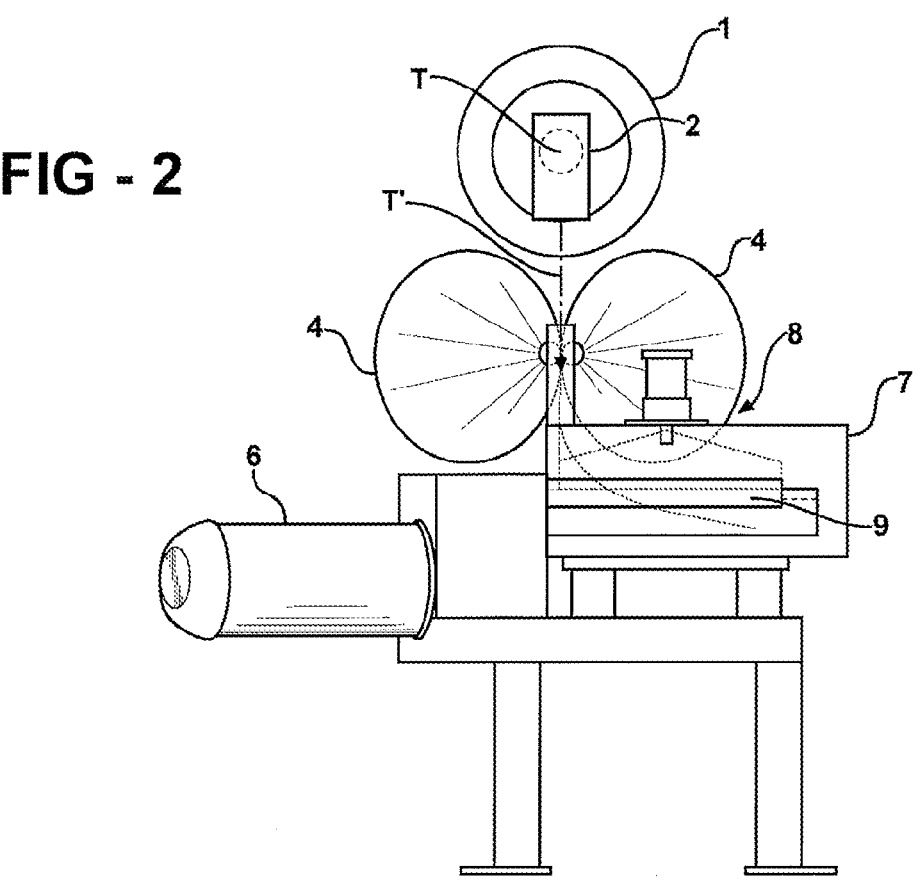
FIG. 2 is a simplified frontal elevation depicting the apparatus employed in the extrusion methodology of the present invention.
Figure 3:
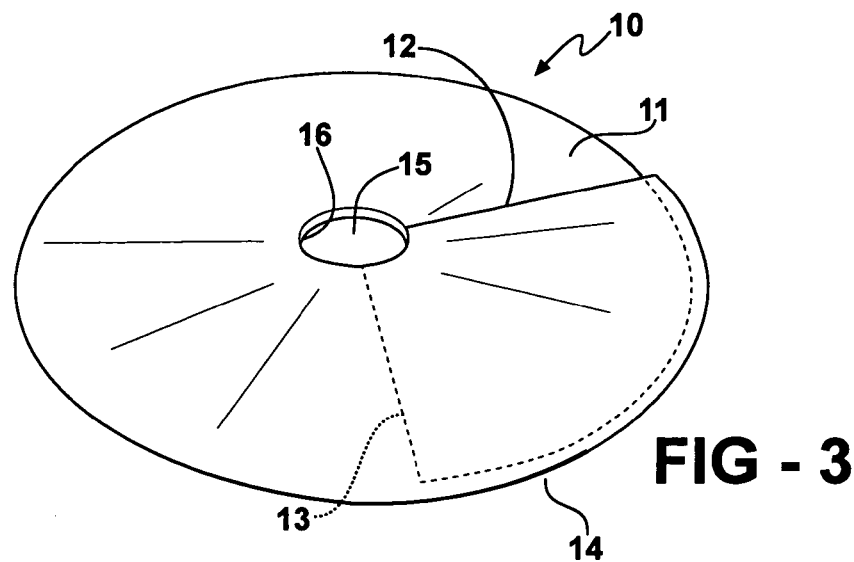
FIG. 3 is a perspective view showing a vegetation barrier according to the present invention in an exemplary operational environment.

Referring now to the drawings, wherein like numerals indicate like or corresponding parts throughout the several views, the present invention will first be seen to comprise a method for forming radiused plastic articles from an extruded fluid polymeric material, the method proceeding as follows:

First, there is provided an extruding machine 1 terminating in an extrusion die 2 defining a generally horizontal path of travel T for a fluid plastic material therethrough from an upstream end 2a, where the fluid plastic material enters the die, to a downstream end 2b at the opposite end of the extrusion die (FIGS. 1 through 3). The extruding machine 1 is, except as otherwise indicated, of conventional construction and, according to the illustrated embodiment, comprises a single screw type extruder. However, those skilled in the art will appreciate, with the benefit of this disclosure, that the methodology of the present invention may be adapted to use with various conventional extruding machines. Likewise, the polymeric material may, as desired, comprise any conventional extrudable polymer.

The extrusion die 2 has an outlet opening 3 extending longitudinally in the direction of the path of travel T such that the extrusion die outlet opening 3 is characterized by upstream 3a and downstream 3b ends aligned with the upstream 2a and downstream 2b ends of the die 2. The outlet opening 3 is further oriented so that a fluid plastic material is extruded therefrom in a direction T' that is approximately perpendicular to the path of travel T of the fluid plastic material through the extrusion die 2 (FIGS. 2 and 3). In this manner, fluid polymer material extruded from the die 2 is unbalanced in that the extrudate flows in greater volume, and so more rapidly, proximate the upstream end 3a of the die opening 3, while flowing in lesser volume, and so less rapidly, proximate the downstream end 3b.

While, as shown in FIG. 1, die opening 3 is characterized by a substantially constant transverse cross-section along the length thereof, with the unbalanced extrusion of the polymer essentially accomplished by the orientation of the longitudinal die opening 3 relative to the path of travel T of the polymer material through the die 2, it is contemplated by this invention that modifications to the die 2 as shown, including to the cross-sectional dimensions thereof, may be made to vary, to a greater or lesser degree, the extent to which the extrusion from the outlet opening 3 is unbalanced. The manner of effecting such modifications will, in combination with the instant disclosure, be understood by those skilled in the art.

There is disposed downstream of the die outlet opening 3 at least a first pair of oppositely rotating rollers 4 of tapered diameters, the rollers 4 disposed side by side to receive therebetween the fluid plastic material extruded from the extrusion die (FIG. 1). Rollers 4 are spaced apart relative to each other to maintain the cross-sectional thickness of the extrusion between the upstream and downstream ends thereof.

Rollers 4, which in the illustrated form of the invention are conical in shape, are further oriented such that their longitudinal axes a intersect and their smaller diameter ends 4a are oriented towards the downstream end 2b of the extrusion die 2. Accordingly, this arrangement facilitates drawing the extrudate through the rollers 4 more rapidly proximate the upstream 2a end of the extrusion die outlet orifice 3 and less rapidly proximate the downstream 2b end of the extrusion die outlet orifice, and thus maintaining the radiused shape to the extrudate imparted by the unbalanced extrusion thereof.

It will be understood from the foregoing that the rollers 4 serve to draw the extrudate from the outlet orifice 3 while substantially maintaining the shape of the extrudate as defined by the unbalanced extrusion thereof. And while rollers 4 may be of a configuration and arrangement permitting further shaping of the extrudate, such shaping is not necessary to form the radiused extrusion of the present invention.

Figure 6:
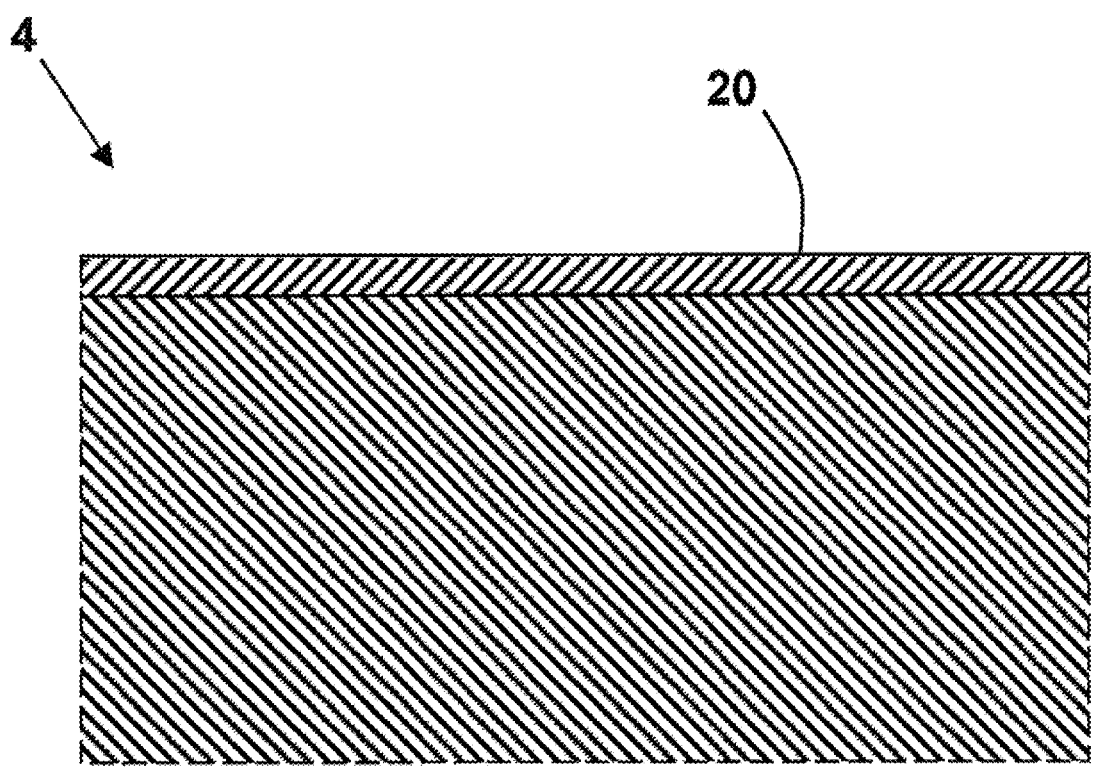
FIG. 6 is a partial cross-sectional view of a roller of the apparatus employed in the extrusion methodology of the present invention.

As shown in FIG. 6, one or both of the rollers 4 may, as desired, also comprise a superficial die 20 for embossing one or both of the opposite surfaces of the extrudate with a desired texture, pattern, or other indicia, including, for instance, with a texture or pattern mimicking natural terrain features, landscaping materials such as wood chips, stones, etc.

Rollers 4 are journalled 5 and driven by at least a first motor 6, which motor is operatively connected to each roller 4 so as to rotate the same in opposite directions at a speed sufficient to draw the extrudate from the die 3. Preferably, though not necessarily, the speed of motor 6 is selectively variable, by any suitable means, in order to control the rate at which the extrudate is drawn by the rollers 4.

As a fluid plastic material is extruded through the extrusion die outlet opening 3, the extrudate is drawn from the extrusion die outlet opening 3 by the oppositely rotating rollers 4 in the manner heretofore described.

The extrudate is subsequently cooled, for instance by passing the extrudate through a cooling tray 7 of recirculating water. And while not depicted in the illustrations, there is provided between the pulling rollers 4, the cooling tray 7, and the cutting means 8 in the exemplary embodiment for carrying out the inventive method one or more support wheels or rollers of known construction arranged to support the extrudate as the same is transferred from the rollers 4 to the cooling tray 7 and on to the cutting means 8.

In a final step, the cooled extrudate is sequentially cut to form therefrom a plurality of radiused plastic articles. To effect this step, there is disposed downstream of the cooling tray 7 cutting means 8 operative to selectively successively cut the extrudate. According to the illustrated form of the invention, the cutting means 8 comprise a reciprocating gap shear 9 responsive to a signal, generated for instance by an encoder, counter, etc., to selectively cut through the continuous extrudate to successively form individual plastic articles of desired arc length (e.g., 270°, 360°, 370°, 450°, etc.). Of course, other known cutting means may be substituted for the exemplary gap shear, including, by way of non-limiting example, a rotating rule die.

And while the foregoing provides an inexpensive and greatly simplified method for forming radiused plastic articles, it will be understood that such articles need not comprise finished products. Rather, it is contemplated that further operations may, as desired, be performed upon the plastic articles formed according to the method of this invention.

Figure 4:
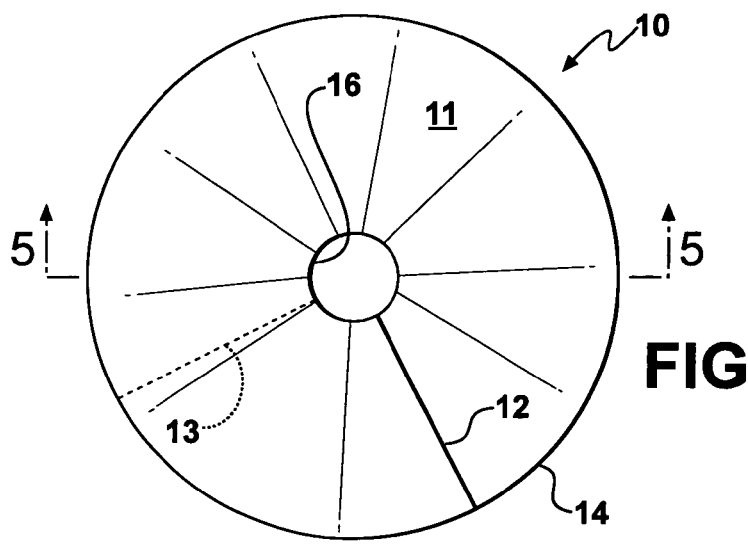
FIG. 4 is a plan view of the vegetation barrier of FIG. 3.
Figure 5:
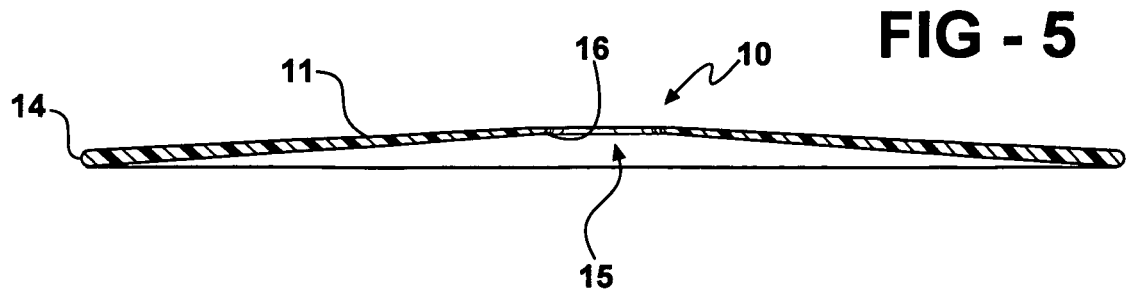
FIG. 5 is a cross-sectional view of the vegetation barrier of FIG. 4.

Turning now to FIGS. 4 through 6, there is shown one inventive plastic article which may be fabricated from the method as described hereinabove. More particularly, such article comprises a vegetation barrier 10 adopted to be disposed on the ground about the trunk of a tree, shrub, or other plant, around a utility post or box, mailbox post, or other structure about which it is desired to prevent the growth of undesirable vegetation in the area covered by the barrier. The vegetation barrier 10 of this invention includes a monolithic plastic body 11 radiused to define a discontinuous, generally circular shape (best seen in FIGS. 4 and 5) having opposite first 12 and second 13 terminal ends defining therebetween the complete arc length of the generally circular shape, an outside circumferential edge 14, and a centrally disposed opening 15 defining an inside circumferential edge 16.

The vegetation barrier 10 is characterized by a default condition (best seen in FIGS. 4 and 5) in which the first terminal end 12 overlaps the second terminal end 13 to a degree sufficient to prevent significant ambient light from penetrating completely between the area of overlap. Heretofore, the ability of ambient light to penetrate the ends of conventional plant shields has resulted in the undesirable growth of vegetation, thus frustrating the intended utility of these apparatus. According to the foregoing, the generally circular shape of the plastic body 11 is thus characterized by an arc length of greater than 360° defined between the opposite first 12 and second 13 terminal ends. In practice, it has been found that an arc length of 450°, by which the extent of overlap of the first terminal end 12 over the second terminal end 13 is approximately 90° in the default condition of the vegetation barrier, is sufficient to prevent ambient light from penetrating this area when the vegetation barrier is in the default condition thereof, as well as in a plurality of expanded conditions wherein the extent of overlap is less.

As best illustrated in FIG. 6, the plastic body 11 is further characterized by a cross-sectional thickness which decreases from a maximum proximate the outside circumferential edge 14 of the body 11 to a minimum proximate the inside circumferential edge 16 bordering the central opening 15. Such varying cross-sectional thickness serves not only to provide a vegetation barrier which is at once characterized by a greater, stabilizing weight proximate the outside circumferential edge, thus helping to ensure that the vegetation barrier 10 stays in place, but also to provide a vegetation barrier which is, by virtue of the inwardly decreasing thickness thereof, more readily conformable to variations in the shape of the underlying ground.

In operation, the terminal ends 12 and 13 of the vegetation barrier 10 are spread apart to permit the shield 10 to be positioned about a tree, shrub, mailbox post, utility box, or other structure with the same disposed in the central opening 15. Thereafter, the terminal ends 12, 13 are permitted to return to the default condition of overlap as shown in FIGS. 4 and 5.

It will be appreciated that the invention as herein disclosed provides a method for forming extruded polymer articles having a desired radiused shape and varying cross-sectional thickness imparted thereto with a minimum of downstream processing, as well as an exemplary radiused polymeric article which may be formed by such method and which improves upon conventional articles of the same genus.

Of course, the foregoing disclosure is merely illustrative of the present inventions, and those of ordinary skill in the art will appreciate that many additions and modifications thereto are possible without departing from the spirit and broader aspects thereof as defined in the appended claims.

The invention in which an exclusive property or privilege is claimed is defined as follows:

1. A method for forming radiused plastic articles from an extruded fluid plastic material, the method comprising the steps of:

(a) Providing an extruding machine terminating in an extrusion die defining a path of travel for a fluid plastic material therethrough between an upstream end and a downstream end of the extrusion die, the extrusion die having an outlet opening extending longitudinally in the direction of the path of travel such that the extrusion die outlet opening is characterized by an upstream end and a downstream end, and the outlet opening further being oriented so that the fluid plastic material is extruded therefrom in a direction that is approximately perpendicular to the path of travel of the fluid plastic material through the extrusion die;

(b) Providing at least a first pair of oppositely rotating rollers of tapered diameters disposed side by side to receive therebetween the fluid plastic material extruded from the extrusion die, the rollers arranged so that their longitudinal axes intersect and their smaller diameters are oriented towards the downstream end of the extrusion die;

(c) Extruding a fluid plastic material through the extrusion die outlet opening, the extrudate being characterized by a higher flow rate proximate the upstream end of the extrusion die outlet opening and a lower flow rate proximate the downstream end of the extrusion die outlet opening to thus form a radiused extrusion;

(d) Drawing the extrudate from the extrusion die outlet opening with the tapered rollers without significantly altering the radiused shape of the fluid plastic material received therebetween;

(e) Cooling the extrudate; and (f) Sequentially cutting said cooled extrudate to form therefrom a plurality of radiused plastic articles.

2. The method of claim 1, wherein further one or both of the tapered rollers comprise a die for embossing the extrudate.

3. The method of claim 1, further comprising the step of providing a cutting station comprising at least a first cutting blade operative to sequentially cut the cooled extrudate in response to a cutting signal, and wherein further said step of sequentially cutting the cooled extrudate is performed by said cutting station.

* * * * *